United States Patent [19]

Shope

[11] Patent Number: 4,595,079
[45] Date of Patent: Jun. 17, 1986

[54] TREE CLIMBING PLATFORM

[76] Inventor: James H. Shope, 8285 Garth Point La., Rapid River, Mich. 49878

[21] Appl. No.: 720,830

[22] Filed: Apr. 8, 1985

[51] Int. Cl.$^4$ .................. A01M 31/02; A45F 31/26; A47C 9/10
[52] U.S. Cl. .................................. 182/187; 108/152; 182/134
[58] Field of Search .................. 182/187, 188, 134; 297/70, 423; 108/152

[56] References Cited

U.S. PATENT DOCUMENTS

| | | | |
|---|---|---|---|
| 248,656 | 10/1881 | Koken et al. | 297/70 |
| 3,065,821 | 11/1962 | Hundley, Jr. | 182/187 |
| 3,460,649 | 8/1969 | Baker et al. | 182/187 |
| 3,817,350 | 6/1974 | Gray | 182/187 |
| 3,991,853 | 11/1976 | Bridges | 182/187 |
| 4,022,292 | 5/1977 | Van Gompel | 182/187 |
| 4,236,602 | 12/1980 | Leggett | 182/187 |
| 4,316,526 | 2/1982 | Amacker | 182/135 |
| 4,331,216 | 5/1982 | Amacker | 182/187 |
| 4,369,858 | 1/1983 | Babb | 182/134 |
| 4,488,620 | 12/1984 | Gibson | 182/187 |

Primary Examiner—Reinaldo P. Machado
Attorney, Agent, or Firm—Andrus, Sceales, Starke & Sawall

[57] ABSTRACT

The deck of a tree climbing platform is mounted upon a suitable frame including opposed generally parallel side members. A frame member is disposed on each side of the deck and extends angularly upwardly and rearwardly relative to the deck. A U-shaped foot member having generally parallel side legs connected by a foot rung member is disposed with a side leg to each side of the deck and extends angularly downwardly and forwardly relative to the deck. Transversely spaced and axially aligned pivot connections are provided in the opposed deck side members adjacent to the forward end of the deck for pivotally mounting the corresponding frame member and distal end of the foot member side leg to each side of the deck. The angularly disposed frame members extend beyond the rear of the deck and pivotally mount a linkage member intermediate their length. A second linkage member is pivotally mounted to each of the side legs of the U-shaped foot member. The distal ends of the linkage member and second linkage member on each side of the deck being secured by a common fastener to the corresponding deck side member adjacent to the rear of the deck to render the tree climbing platform operable.

6 Claims, 11 Drawing Figures

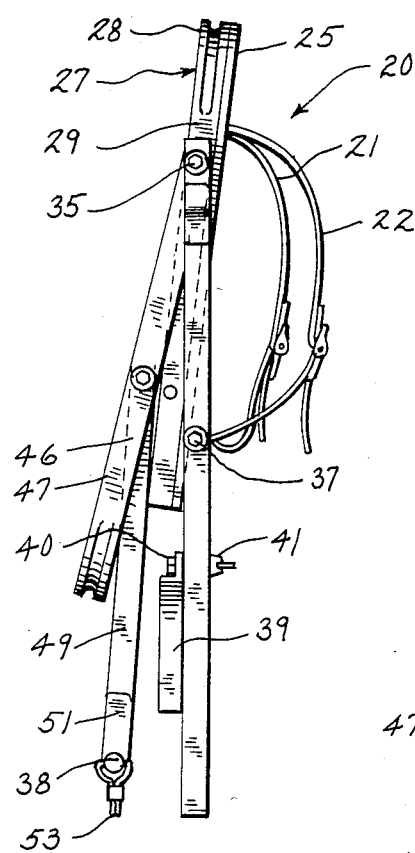
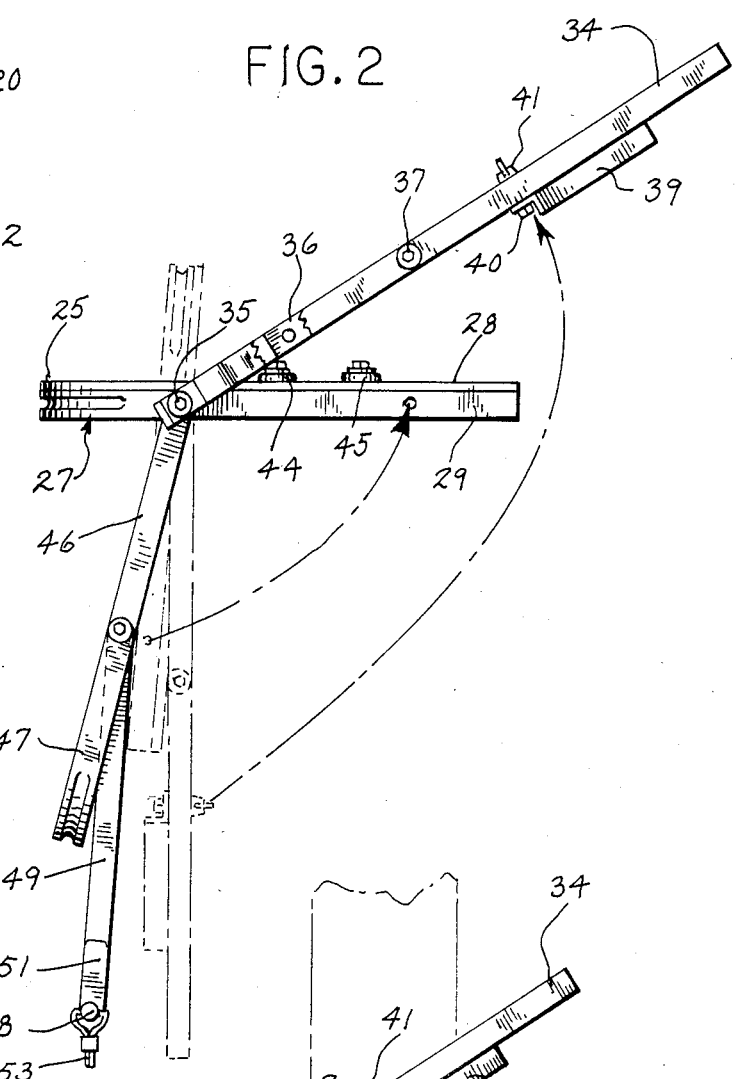
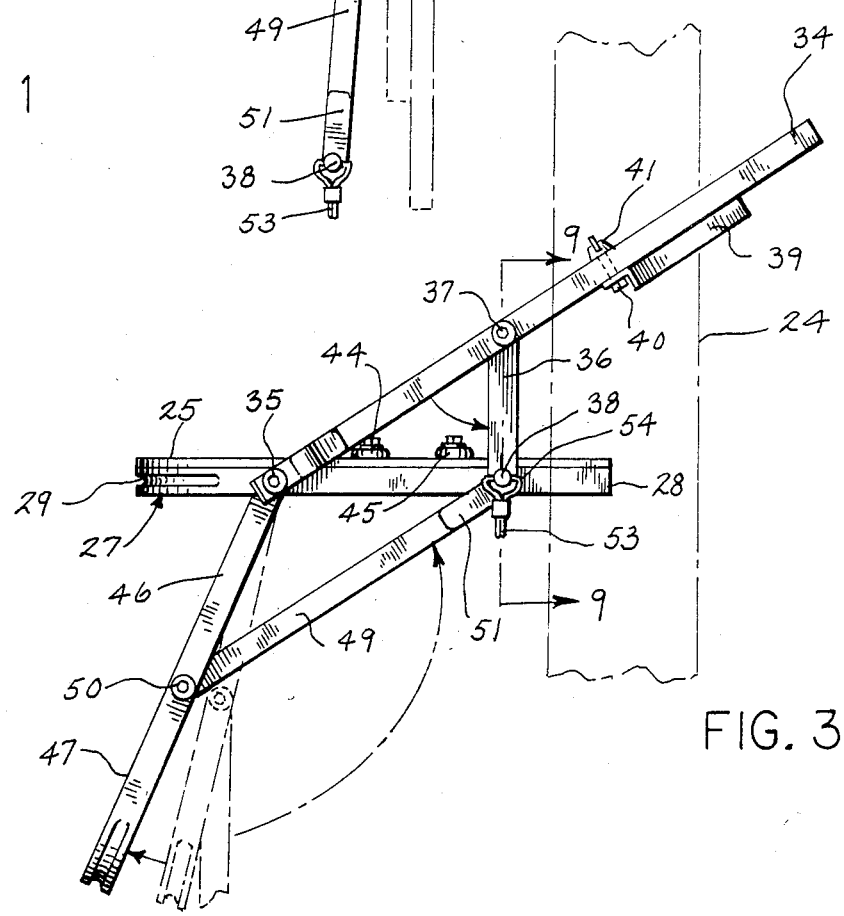

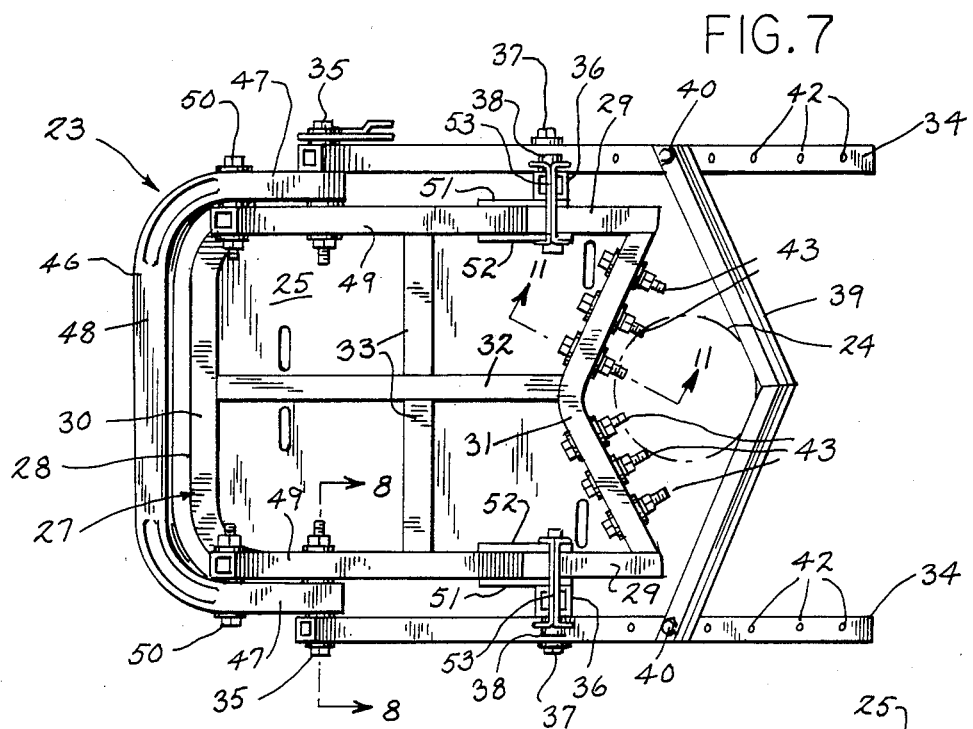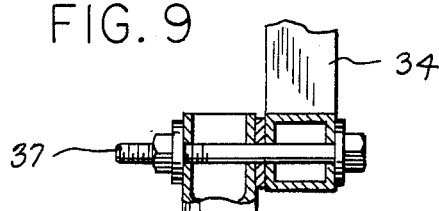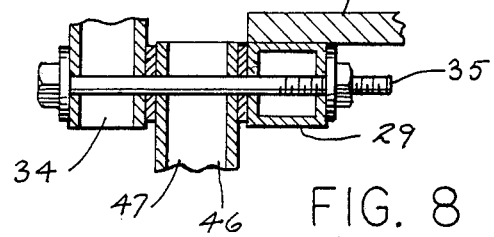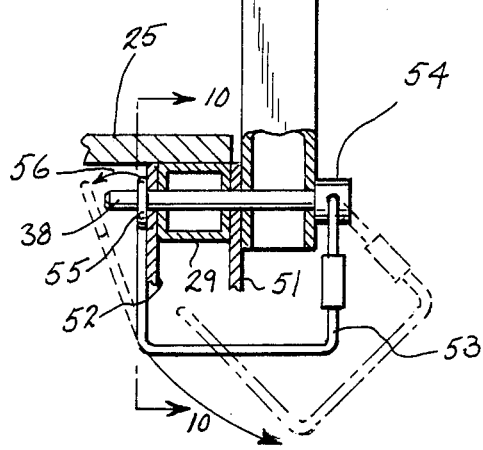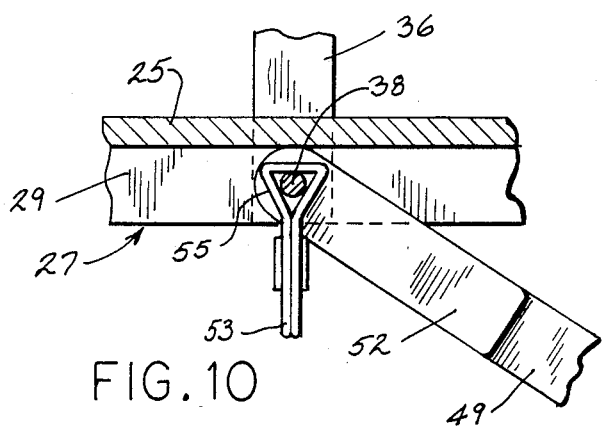

4,595,079

TREE CLIMBING PLATFORM

BACKGROUND OF THE INVENTION

This invention relates to a portable tree climbing platform for hunters or the like.

The need for portability generally dictates that the plate or deck of a tree climbing platform remain relatively small so that weight is not unduly increased. Thus, when a hunter is seated or standing on the plate or deck of a tree climbing platform, the tree trunk supporting the platform is immediately adjacent to him to render weapons handling for many shots very awkward and therefore often quite inaccurate. It is generally an object of this invention to provide a tree climbing platform that is improved in many respects, and which further includes a foot rung suitable for the user to stand up upon, when a target appears, to place his body in spaced relation relative to the supporting tree and thus avoid the awkwardness that results from closeness to the tree.

SUMMARY OF THE INVENTION

Broadly the invention is directed to a tree climbing platform for hunters and the like and includes a deck. The deck is supported on frame means which includes opposed side members. In service, the deck and its frame means are disposed generally horizontally and engagable rearwardly with the side of a tree. Frame members are disposed on opposite side of the deck and are pivotally connected to the deck frame side members adjacent to the forward end of the deck. In service, the frame members extend angularly, upwardly and rearwardly beyond the rearward end of the deck and on opposite sides of a tree. Linkage means are carried by the frame members for connection to the deck frame side members adjacent to the rearward end of the deck to fix the angularity of the frame members. Bar means are secured between the frame members on the opposite side of a tree and at a higher elevation from the deck and its frame means to render the platform self-supporting when occupied by a user. A U-shaped member having opposed side legs connected by an intermediate leg forms a part of the platform structure. The distal ends of the side legs are pivotally connected to the opposed deck frame side members adjacent to the forward end of the deck, and the U-shaped member extends angularly downwardly and forwardly relative to the deck to place the intermediate leg in position forwardly of the deck to serve as a foot rung member. And means are provided to fix the angularity of the U-shaped member.

DESCRIPTION OF THE DRAWING FIGURES

The drawings furnished herewith illustrates the best mode presently contemplated for the invention and are described hereinafter:

In the Drawings:

FIG. 1 is a side elevation and shows the portable tree climbing platform of this invention in a folded condition for portability;

FIG. 2 and FIG. 3 are side elevations and generally show how the folded platform is opened and mounted relative to a tree or pole, shown in dashed lines in FIG. 3;

FIG. 7 is a bottom plan view of the hunting platform;

FIG. 8 is a detail section taken generally on the line 8—8 of FIG. 7;

FIG. 9 is a detail section taken generally on the line 9—9 of FIG. 3;

FIG. 10 is a detail section taken generally on line 10—10 of FIG. 9; and

FIG. 11 is a detail section taken generally on the line 11—11 of FIG. 7.

DESCRIPTION OF THE ILLUSTRATED EMBODIMENT

Figure 4:
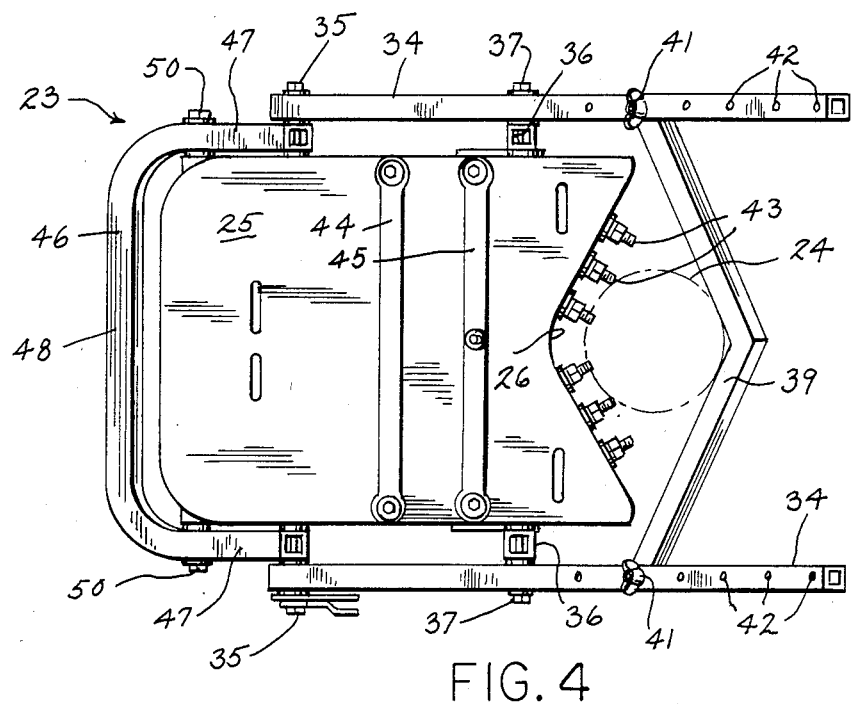
FIG. 4 is a top plan view of the platform as mounted on a tree or pole.
Figures 5, 6:
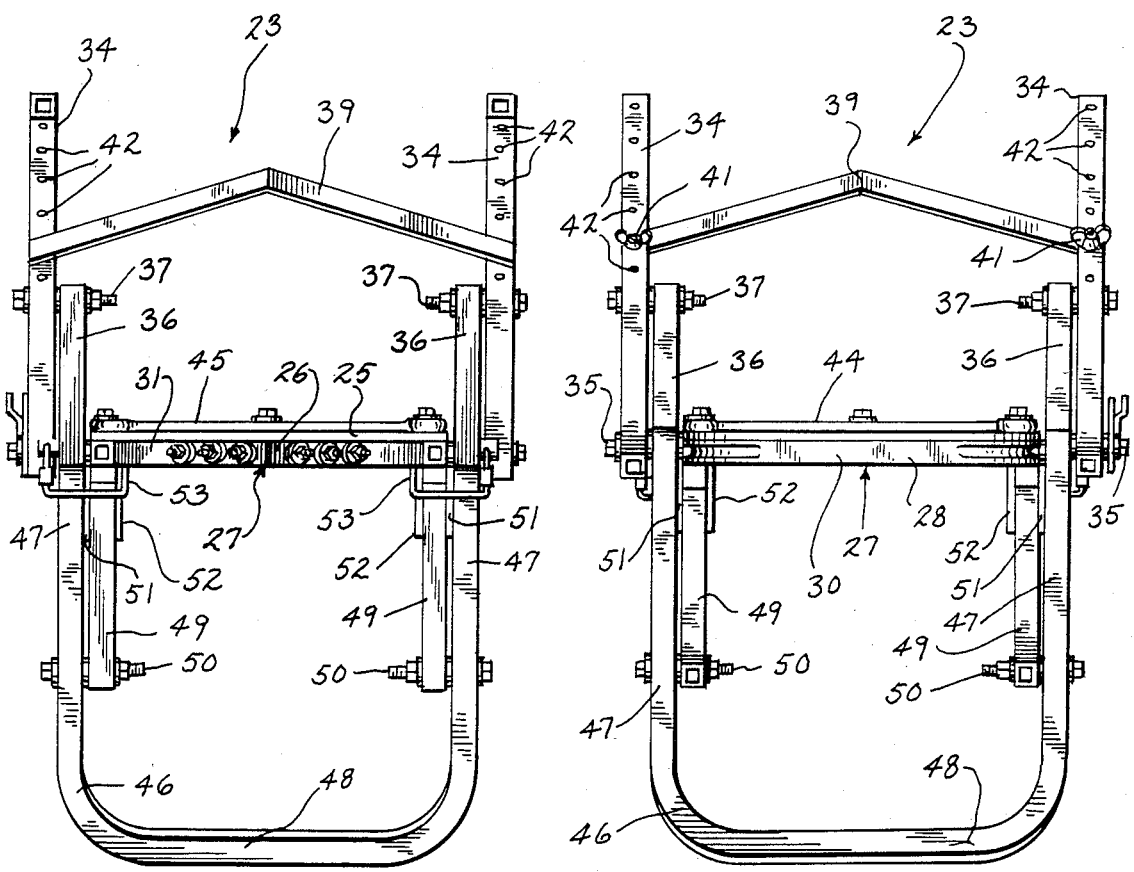
FIG. 5 is a rear elevation of the hunting platform.
FIG. 6 is a front elevation of the hunting platform.

Referring to the drawings, the hunting platform 20 is shown in the folded or portable condition in FIG. 1. A pair of transversely spaced shoulder straps 21 and 22 generally enhance its portability. FIGS. 2 and 3 generally indicate how the folded platform 20 is opened and rendered operable. The opened and operable platform 23 is shown in FIG. 3 in relation to a tree or pole 24. The hunting platform structure is generally symmetrical relative to a central vertical plane.

The operable hunting platform 23 as variously shown in FIGS. 3-7 includes a generally horizontal plate or deck 25 for sitting or standing. As perhaps best shown in FIG. 4, the deck 25 is generally rectangular with a generally V-shaped notch 26 at the inner or rearward end thereof. The deck 25 is mounted for support upon the aluminum weldment 27 which presents a generally planar upper surface for receiving the deck.

The deck weldment 27 is perhaps best shown in FIG. 7 and comprises a U-shaped frame member 28 having generally parallel side legs 29 joined forwardly by the transversely extending connecting leg 30. A V-shaped frame member 31 is disposed rearwardly and extends between and is welded to the spaced side legs 29 generally at the distal ends of the legs. The U-shaped frame member 28 and V-shaped frame member 31 of the weldment 27 generally define the horizontal reaches of the deck 25 and thus provide for the peripheral support for the deck.

Interiorly of the peripheral frame members 28 and 31, the weldment 27 further includes the frame member 32 disposed generally midway between and generally parallel to the U-shaped member side legs 29. The member 32 extends between and is respectively welded to the connecting leg 30 and member 31. The weldment 27 also includes the transversely aligned cross frame members 33 disposed generally at the longitudinal midpoint of the side legs 29 and which extend between and generally normal to the frame member 32 and the respective side legs 29. Since the frame members 28, 31, 32 and 33 comprising the deck weldment 27 are all box-section members, they provide for a plate or deck 25 that is generally both sturdy and rigid.

An aluminum box-section side frame member 34 is disposed on each side of the deck 25 with the lower end thereof pivotally connected on the pin member 35 extending transversely through the corresponding weldment side member 29 generally adjacent to the forward edge of the deck. In the operable hunting platform 23, the respective side frame members 34 extend rearwardly and upwardly at an angle relative to the deck 25 from the connection with pin members 35. An aluminum box-section linkage member 36 is pivotally connected interiorly to each of the frame members 34 on the transverse pin 37. The angle of the side frames 34 relative to the deck 25 is established when the linkage members 36 extend generally vertically downward for connection at the lower ends thereof onto the corresponding transverse pin members 38 extending through the weldment side members 29 generally adjacent to the rearward end of the deck as generally shown in FIG. 3.

The side frame members 34 extend rearwardly beyond the rearward end of the deck 25 and an angle iron bar 39 extends transversely for connection therebetween by means of bolts 40 and wing nuts 41. The bar 39 is V-shaped and projects oppositely from the deck notch 26. The bar 39 is adjustable relative to the deck 25 as provided for by the plurality of spaced bolt holts 42 adjacent to the distal end of the frame members 34 for accommodating trees of different diameters.

In service, and as generally shown in FIGS. 3 and 4, the side frame members 34 extend on opposite sides of a tree 24, and the bar 39 is engaged with the opposite side of the tree from the engagement by the deck 25. With the weight of a hunter occupant on the deck 25 in service, the bar 39 will be caused to "bite" into the corresponding side of the tree 24, while the transversely spaced threaded member pins 43 projecting rearwardly from the weldment member 31 serve to "bite" into the tree oppositely and at a lower elevation with respect to the bar to set up an advantageous force pattern to self supportingly secure the platfrom 23 relative to the tree. With the feet of the hunter secured within its spaced elastic bands 44 and 45 on the deck 25 of the operable platform 23, the hunter is also enabled to climb the tree by "hugging same" or with the benefit of a hand climber, not shown, by alternately securing the platform relative to the tree and relieving the condition of securement while simultaneously lifting or lowering the platform to a different level for resecurement.

The operable hunting platform 23 further includes a U-shaped foot member 46 having generally parallel side legs 47 joined by its connecting foot rung 48. Foot member 46 is an aluminum box-section member that projects angularly forwardly and downwardly relative to the deck 25 from the pin members 35 pivotally supporting the distal ends of the corresponding side legs 47. The angularity of the foot member 46 relative to the deck 25 places the foot rung 48 forwardly of the deck as shown in FIGS. 3 and 4. The respective side legs 47 of the foot member 46 are disposed on the pin members 35 between the weldment side member 29 and corresponding side frame member 34 such that the foot member side legs are disposed generally in a common vertical plane with the corresponding linkage member 36 as perhaps best shown in FIGS. 5 and 6.

The angularity of the foot member 46 relative to the deck 25 and location of the foot rung 48 forwardly of the deck, is established by the aluminum box-section linkage members 49 disposed on opposite sides of the deck and which extend between the respective foot member side legs 47 and the corresponding pin member 38 carried rearwardly on the deck weldment side members 29. The opposed foot member side legs 47 each carry a transversely extending pin member 50 at generally the midpoint of their length. The pin members 50 are generally transversely aligned and each pivotally mounts one end of a linkage member 49 to the inner side of a foot member side leg 47. The sturdy box-section linkage members 49 are thus disposed in a common vertical plane with the corresponding weldment side members 29 and terminate at their upper end adjacent to the weldment with opposed longitudinal side extensions 51 and 52. The transversely aligned holder provided in the linkage member extensions 51 and 52, the weldment side member 29, and the lower end of the linkage member 36 receive the connecting pin member 38 perhaps best shown in FIG. 9.

The several transversely spaced and aligned pivotal connections, on the pin members 35 adjacent to the forward end of the deck weldment 27, on pin members 37 between the side frame members 34 and linkage members 36, and on pin members 50 between the foot member side legs 47 and linkage members 49, are ordinarily not disassembled. To open the folded hunting platform 20 of FIG. 1 or to effect fold-down of the open platform 23, the pivotal connections on pin members 35, 37, 50 are simply pivoted or bent corresponding to the desired condition for the platform. Only the transversely spaced and aligned connections on pin members 38 require disassembly and assembly to effect opening and fold-down of the platform. Thus, the folded hunting platform 20 is rendered open or operable with relative ease and without need for tools.

With reference to FIGS. 9 and 10, one of the pin members 38 is shown assembled in place for the open or operable hunting platform 23. As shown, the pin member 38 is retained in place by a U-shaped spring wire-keeper 53. The distal end of one of the parallel legs of the wire keeper 53 is pivotally connected to the head 54 of the pin member 38. In assembled relation, a loop 55 at the distal end of the other parallel leg is flexed over the end of the pin member 38 opposed from the head 54 and serves to preclude any possible accidental removal of the pin member. Only with deliberate flexing of the wire keeper 53 as shown by the arrow 56 is the keeper opened.

Since the framing members and foot support members are largely fabricated from aluminum, the tree climbing platform structure of this invention will be generally light weight. The platform structure is opened and rendered operable and folded with relative ease requiring no tools. With the framing members and foot support members being largely box-section members, a sturdy structure is realized permitting the user to stand on the foot rung, if desired, with the platform structure in servie. In any event, since the platform structure is generally placed in service well above the ground, a prudent user will use the shoulder straps 21 and 22 or other strap means as a safety belt.

Various modes of carrying out the invention are contemplated as being within the scope of the following claims particularly pointing out and distinctly claiming the subject matter which is regarded as the invention.

I claim:

1. In a tree climbing platform for hunters and the like, a deck, frame means supporting the deck and including opposed side members, said deck and its frame means in service being disposed generally horizontally and engageable rearwardly with a tree, frame members disposed on opposed sides of the deck and being pivotally connected to the deck frame means side members adjacent to the forward end of the deck, said frame members in service extending angularly upwardly and rearwardly beyond the rearward end of the deck and on opposite sides of the tree, first linkage means pivotally connected to the frame members, bar means secured between the frame members on the far side of the tree and at a higher elevation relative to the deck to render the platform self-supporting in service, a U-shaped member having opposed side legs joined by an intermediate leg, the distal ends of said side legs being pivotally connected to the opposed deck frame means side members adjacent to the forward end of the deck and said U-shaped member extending angularly downward and forward relative to the deck to place the intermediate leg in position forwardly of the deck in service to serve as a foot rung member, second linkage means pivotally connected to the side legs of the U-shaped member, the said several pivotal connections providing for folding of the platform elements to thereby provide for ease of portability, said platform elements being extendable to their in service condition, and means for securing the distal ends of the first and second linkage means to the deck frame means side members adjacent to the rearward end of the deck to fix the platform elements in their extended in service condition.

2. The structure as setforth in claim 1 wherein the deck frame means comprises a weldment including a U-shaped member having opposed side legs connected by an intermediate leg forwardly relative to the deck, said side legs comprising the deck frame side members, said weldment further including a V-shaped member extending transversely between the deck frame side members rearwardly relative to the deck, said U-shaped member and V-shaped member being generally disposed at the periphery of the deck and providing for a generally rectangular deck having a V-shaped notch rearwardly thereof.

3. The structure as set forth in claim 2 wherein the U-shaped member and V-shaped member are box-section members.

4. The structure as set forth in claim 2 wherein the deck weldment further includes fore-and-aft extending and transversely extending frame members to provide for support of the deck intermediate its periphery.

5. The structure as set forth in claim 1 wherein the angularly disposed frame members and the angularly disposed U-shaped member are mounted on common pivots on opposed sides of the deck.

6. The structure as set forth in claim 1 wherein the means for securement between the deck frame means side members and the first and second linkage means comprises a connection on a common axis on each side of the deck.

* * * * *